United States Patent [19]
Boelte

[11] Patent Number: 4,718,444
[45] Date of Patent: Jan. 12, 1988

[54] VALVE SEAT RETRACTION METHOD AND APPARATUS
[75] Inventor: Leon W. Boelte, Norman, Okla.
[73] Assignee: KF Industries, Inc., Oklahoma City, Okla.
[21] Appl. No.: 938,150
[22] Filed: Dec. 4, 1986
[51] Int. Cl.⁴ .................. F16K 43/00; F16K 5/20
[52] U.S. Cl. ..................... 137/15; 137/315; 137/327; 251/159; 251/174; 251/188; 251/315; 251/316
[58] Field of Search ............ 137/15, 315, 316, 327; 251/159, 160, 174, 188, 315, 316

[56] References Cited
U.S. PATENT DOCUMENTS

| | | | |
|---|---|---|---|
| 3,037,738 | 6/1962 | Jackson et al. | 251/315 |
| 3,171,429 | 3/1965 | Sturmer et al. | 137/315 |
| 4,151,855 | 5/1979 | Levin et al. | 137/315 |
| 4,175,577 | 11/1979 | Kacal et al. | 137/315 |
| 4,262,691 | 4/1981 | Kacal | 137/315 |
| 4,266,566 | 5/1981 | Kacal et al. | 137/316 |
| 4,388,945 | 6/1983 | Johnson et al. | 137/315 |
| 4,390,039 | 6/1983 | Johnson et al. | 137/315 |

Primary Examiner—George L. Walton
Attorney, Agent, or Firm—Epstein & Edell

[57] ABSTRACT

Selective retraction of a spring-biased valve seat from slidable sealing engagement with a ball valve member is effected by a threaded retraction tool inserted through a threaded retraction port normally sealed by a removable sealing screw and gasket. The tapered distal end of the tool contacts a radially outward-facing and convex camming surface of the valve seat that tapers toward the forward/sealing end of the seat. Rotation of the tool in a direction to increase insertion causes the distal end of the tool to slide along the camming surface while forcing the valve seat away from the valve ball in opposition to the resilient bias sealing force. The taper in the camming surface may be provided as a smooth generally parabolodial configuration or as discrete surface segments subtending different respective cam angles with a reference plane oriented perpendicular to the direction of the spring bias force.

21 Claims, 9 Drawing Figures

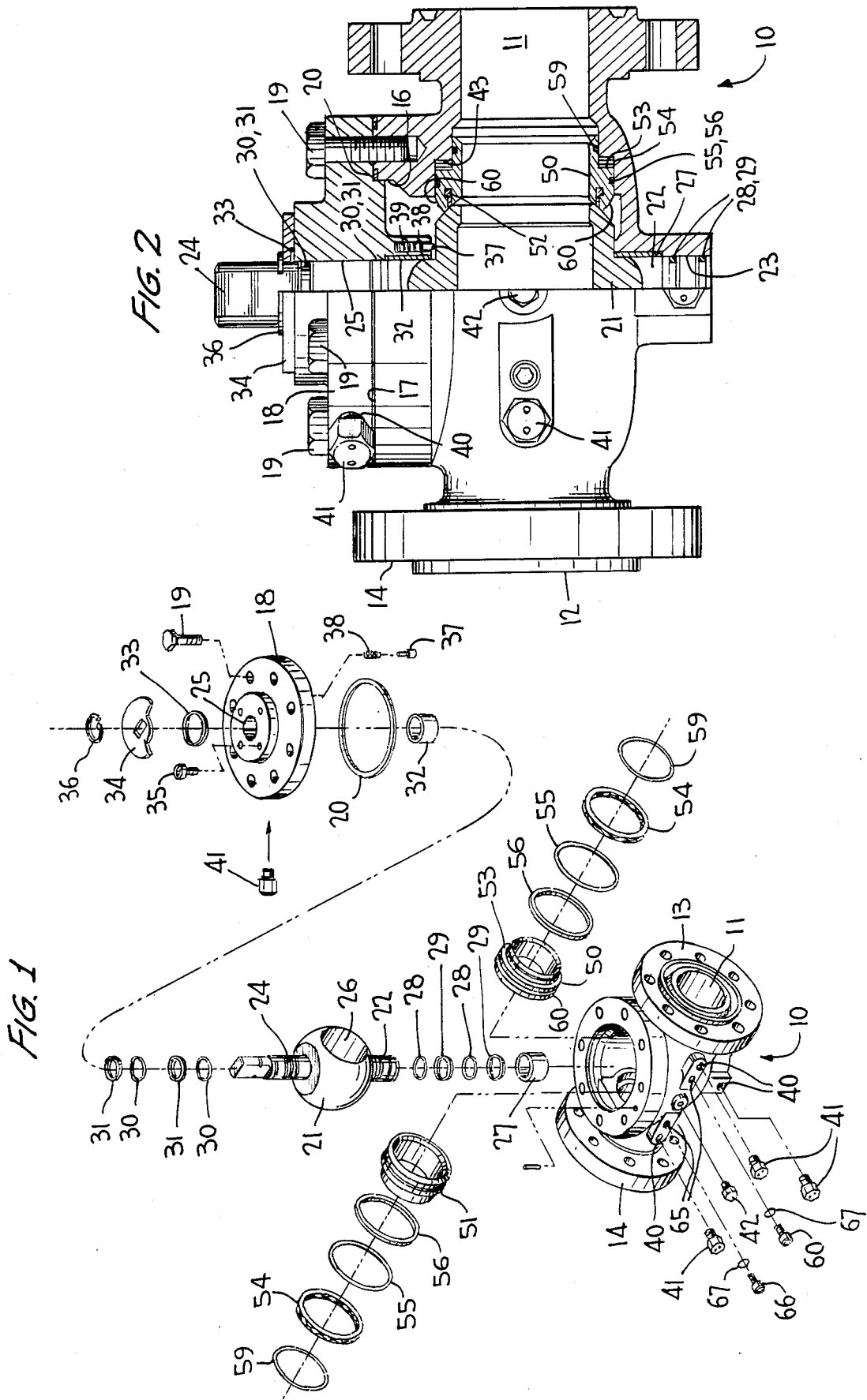

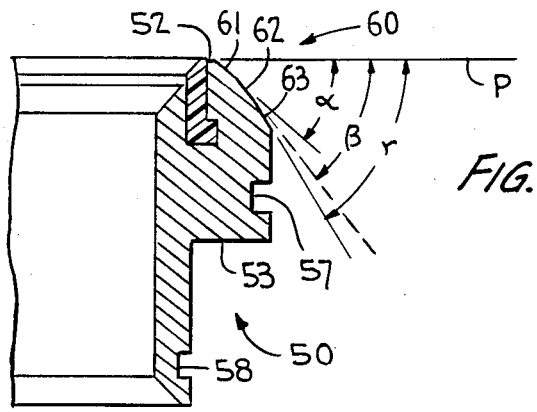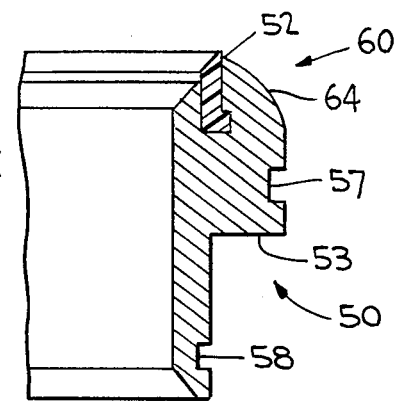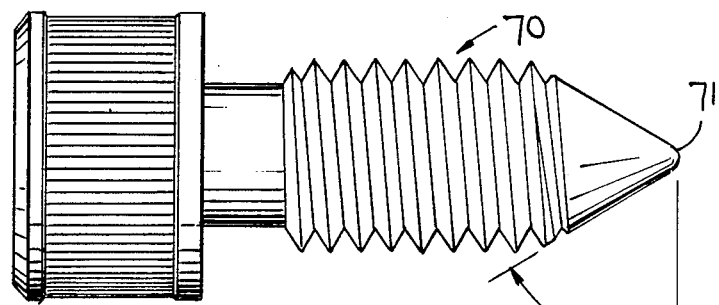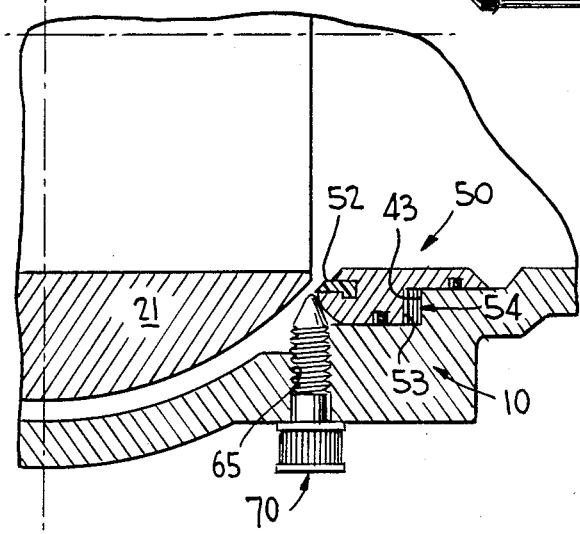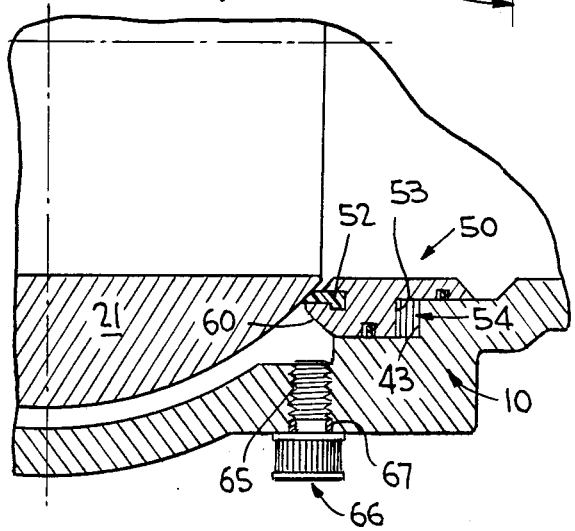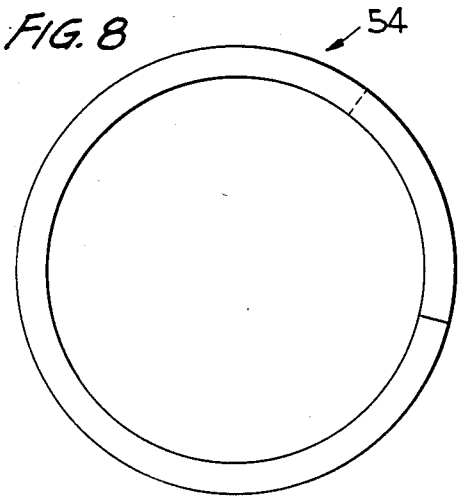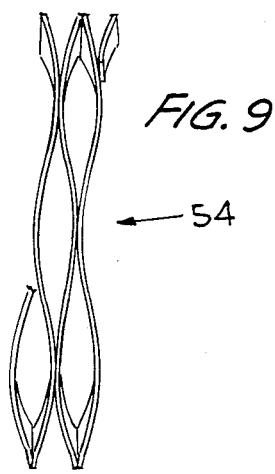

VALVE SEAT RETRACTION METHOD AND APPARATUS

BACKGROUND OF THE INVENTION

1. Technical Field:

The present invention relates to ball valves, and, more particularly, to an improved method and apparatus for retracting a spring-loaded ball valve seat from a ball valve member.

2. Discussion of the Prior Art:

Top entry ball valves are well known in the prior art and are widely used to eliminate the need for removing the entire valve assembly from a pipeline for repair and maintenance. Examples of such valves are disclosed in U. S. Pat. Nos. 3,037,378 (Jackson et al); 3,171,431 (Hansen et al); 3,771,545 (Allen); 3,830,465 (Allen); 3,895,776 (Laurens); 3,985,334 (Domyan); 4,266,566 (Kacal et al); 4,388,945 (Johnson et al); 4,390,039 (Johnson et al); in British Pat. No. 1,215,159 (Verdurand et al); and in a 1981 brochure published by Cameron Ball Valve Products of Houston, Texas, entitled "Cameron's New Top Entry Ball Valve". These disclosures, insofar as they serve as general background and examples of the state of the art, are expressly incorporated herein, in their entireties, by this reference.

It has been found desirable to employ spring-loaded valve seats in top entry ball valves in order to provide optimally reliable sealing capability. However, the resulting structures have made it difficult to remove the ball valve member from, and to insert that member into, the valve body. In some valves (for example, see the Kacal et al patent), additional components are incorporated into the ball member and the housing in order to facilitate removal of the ball from the housing. The additional components, however, increase the cost and subject the unit to greater potential for failure.

Another prior art valve (for example see the Verdurand et al British Patent) provides a fork-like tool that can be inserted into the valve housing between the seat and ball and then pivoted to urge the seat away from the ball in opposition to the spring bias force. In order to retain the seat in its retracted position after the tool is removed, a separate latch mechanism is required on the valve body. The latch adds to the cost and the likelihood of failure of the valve assembly.

The two Johnson et al patents describe top entry ball valve assemblies which are intended to overcome the aforementioned disadvantages. In particular, to disassemble the Johnson et al valves one must first remove the bonnet or cover to expose access holes through which the two seats may be contacted by specially-provided cylindrical pins having tapered ends. The pins (two for each seat) are inserted until their cylindrical portions contact the valve seat to force the seat away from the ball member in opposition to the spring bias so that the ball member may be removed from the assembly. Since the pins are longitudinally slidable in the access opening, there is very little precision or control of seat retraction available during the insertion procedure. On the other hand, precision and control are desirable in order to avoid damage to the retainer spring and to permit both sides of the seat to be retracted equally so as to avoid deformation of the seat. In addition, it is impossible to retract the seat in the Johnson et al valves without removing the bonnet or cover. Seat retraction without bonnet removal is a desirable feature, particularly to effect flushing of debris from between the seat and ball without exposing the entire housing interior to what may be a contaminated ambient environment.

The valves disclosed in the Laurens patent and the Cameron brochure overcome the disadvantages associated with the Johnson et al valves. In particular, the seat of the Laurens valve is urged against the ball by means of a spring which is itself urged against the seat by a spacer or load ring held in place by a load screw. The screw has a conical tip and is positionally adjustable to control the bias force applied by the spring in urging the seat against the ball. Retraction of the seat is effected by loosening the screw. The primary disadvantage of this arrangement resides in the fact that the sealing force between the seat and ball depends upon the load screw position. This affects the precision and uniformity of the seal. Moreover, if the two load screws for each seal are differently positioned, the bias force on that seal will differ at diametrically opposite locations. The latter problem affects the operating characteristics of the valve and can result in permanent deformation of the seal when exposed to high fluid pressures in the line.

OBJECTS AND SUMMARY OF THE INVENTION

It is therefore an object of the present invention to provide a method and apparatus for controllably retracting a spring-loaded seat member from a ball valve member without any of the disadvantages set forth above.

It is another object of the present invention to provide a method and apparatus for retracting a spring-loaded valve seat from a ball valve in a precisely controlled manner without requiring the valve body cover to be removed and without affecting the uniformity of the sealing function during normal valve operation.

Another object of the present invention is to provide a method and apparatus for controllably retracting a spring-loaded valve seat from a ball valve without adding special structure to the valve and without affecting the valve operating characteristics.

In accordance with the present invention an annular valve seat includes a radially outward-facing convex camming surface having a contour which varies, either continuously or in discrete steps, in an axial (i.e., parallel to flow) direction. Specifically, the angle between the radially outward-facing surface and a reference plane, oriented perpendicular to the flow direction (or between the tangent to that surface and the same reference plane), increases in a direction away from the forward end of the seat which contacts the ball valve member. A pair of threaded retraction ports for each seal member extend through respective opposite sides of the valve housing and are normally sealed by means of retraction port screws and seals which are removable to permit threaded seat retraction tools to be inserted into the ports. Each tool has a substantially conical distal end which moves radially inward of the valve body as the tool is rotated in its threaded engagement with the retraction port. The ports are positioned axially of the housing such that the end of the tool first contacts the camming surface portion of the seat member most remote from the forward end of the seat when the seat and ball members are fully engaged. In other words, the tool first contacts the camming surface portion which makes the largest angle with respect to the reference plane perpendicular to flow. As the tool is moved radially inward it applies an axial force component to the seat member to urge the seat member axially away from the ball member. As the seat member moves away from the ball, in opposition to the bias spring force, the tool contacts successive portions of the camming surface which subtend successively smaller angles with the reference plane. As the angle becomes smaller the axial movement of the seat member becomes less in response to a radial insertion change in the tool. Stated otherwise, each rotation of the tool in the retraction port produces a smaller axial movement of the seat member as the camming surface angle decreases at the point of tool contact. In addition, the force applied in opposition to the bias spring increases as the camming surface angle decreases at the point of contact. This latter feature enables the retraction tool to more effectively and stably oppose the increasing force exerted by the bias spring as it is compressed by the gradually retracted seat. In order to remove the ball valve from the assembly, the valve seats can be retracted in the manner described, either before or after the housing cover is removed. If it is desired to retract a valve seat merely to dislodge debris from the interface between the seat and ball, the seat can be retracted precisely to the extent desired without removing the housing cover.

The seat retraction technique of the present invention permits precise control of the retraction position without requiring structure that affects normal valve operation. Specifically, the bias spring force which urges the seat member against the ball member is independent of the retraction tool and remains constant and uniform along the ball/seat interface. Further, no additional permanent structure is required on the ball or seat, or in the housing, to effect seat retraction. Finally, since the retraction tool directly contacts the seat member (i.e., at the camming surface), in contradistinction to indirect contact through a load ring and spring, predictable and accurate control of seat member movement is assured.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings wherein like reference numerals in the various figures are utilized to designate like components, and wherein:

FIG. 1 is an exploded view in perspective of a ball valve assembly employing the seat retraction arrangement of the present invention;

FIG. 2 is a view in elevation and partial section of the valve assembly of FIG. 1;

FIG. 3 is a detailed view in partial section of a portion of one embodiment of a valve seat employed in the assembly of FIGS. 1 and 2;

FIG. 4 is a view in section of a portion of an alternative embodiment of the valve seat;

FIG. 5 is a side view in elevation of a retraction tool which may be utilized to effect retraction of the valve seat in the assembly of FIGS. 1 and 2;

FIG. 6 is a diagrammatic illustration of the manner in which the retraction tool of FIG. 5 interacts with the valve seats of FIGS. 3 or 4 in order to effect valve seat retraction in the valve assembly of FIGS. 1 and 2;

FIG. 7 is a diagrammatic illustration of the manner in which the retraction port, providing access to the seat assembly for the retraction tool, may be sealed during normal operation of the valve assembly of FIGS. 1 and 2;

FIG. 8 is a view in plan of a bias spring employed to urge the valve seat into engagement with the valve ball member in the valve assembly of FIGS. 1 and 2; and FIG. 9 is a side view in elevation of the spring of FIG. 8.

DESCRIPTION OF THE PREFERRED EMBODIMENTS

Referring specifically to FIGS. 1 and 2 of the accompanying drawings, a top entry ball valve assembly includes a valve body or housing 10 having coaxial flow ports 11 and 12 defined at its opposite ends. Ports 11 and 12 may be employed interchangeably as inlet and outlet ports, and their common axis defines the axially or flow direction dimension referred to herein. Annular flanges 13 and 14 surround ports 11 and 12, respectively, and are provided with annularly spaced bores to permit attachment of the valve housing to corresponding flanges in a pipeline. Housing 10 includes an enlarged chamber or interior region 15 at which both ports 11 and 12 terminate and in which flow control operation of the valve assembly is effected. A generally cylindrical access opening 16 communicates with interior region 15 in a direction perpendicular to the flow, which direction is referred to herein as "radial". The end of access opening 16 remote from interior region 15 is surrounded by an annular flange 17 having a plurality of threaded bores adapted to engage respective screws 19 to sealingly engage a removable cover or bonnet 18 over the access opening. A gasket 20 is interposed between bonnet 18 and flange 17 to effect sealing. For purposes of the present description it will be assumed that access opening 16 is defined at the top of the valve housing since that is consistent with "top entry" terminology employed in the relevant industry; however, it is to be understood that the valve assembly can be installed in substantially any orientation, depending upon the pipeline in which it is to be employed.

In the disclosed preferred embodiment, interior region 15 is substantially symmetrical about the radially-extending axis of access opening 16 and is adapted to receive substantially identical valve seat units 50, 51 (described below) at its juncture with each of ports 11 and 12. In addition, a similarly symmetrical ball valve member 21 and its associated hardware, are adapted to be received in interior region 15 through access opening 16 so as to be rotatable about the common axis of the ball valve member and the access opening 16. Specifically, ball valve member 21 includes a generally cylindrical lower stem portion 22 adapted to be journaled in a trunnion bearing 27 disposed in a recess 23 defined at the lower end of the interior region 15 in housing 10. Annular sealing elements 28, 29 are disposed about stem 22 at appropriate locations in recess 23. An upper cylindrical stem 24 is journaled in a trunnion bearing 32 disposed in a central aperture 25 of bonnet 18 through which stem 24 extends. Annular sealing elements 30, 31 are disposed about stem 24 at appropriate locations in aperture 25. A flow passage 26 is defined through the spherical body portion of the ball valve 21 and, depending upon the rotational position of the ball valve in the interior region 15, may be coaxially aligned with ports 11 and 12 to permit substantially unrestricted flow through the valve. As is conventional, the ball valve may be rotated about its axis to misalign passage 26 relative to ports 11 and 12 and thereby restrict or shut off flow, as desired.

The upper end of stem 24 projecting beyond bonnet 18 is appropriately contoured (e.g., provided with two flattened sides) so as to be readily engaged by a suitable wrench or tool for selectively turning the ball valve 21. A stem bearing 33 surrounds stem 24 at the top surface of bonnet 18, as does a stop plate 34 which covers tapped bores formed in a raised central portion of the bonnet. These tapped bores receive a stop screw employed during assembly of the valve unit. A retainer ring 36 is disposed about stem 24 to secure stop plate 34 in place.

The underside of bonnet 18 has a hole 39 defined therein for retaining a grounding pin 37 which is urged downwardly into contact with ball valve 21 by a spring 38. In addition, a plurality of threaded sealant injection apertures 40 are defined through the housing 10 and bonnet 18 to receive respective threaded sealant injection fittings 41. A threaded drain opening 42 is also defined in the valve housing 10 and is sealed by a selectively removable threaded plug 42.

As noted above, two substantially identical annular valve seat members 50, 51 are disposed on opposite sides of the ball valve 21 in interior region 15 at the termini of respective ports 11 and 12. Each valve seat (illustrated in detail in FIGS. 3 and 4) includes a forward end from which a seat ring 52 of nylon, or similar material, extends to provide the actual annular seat contact with ball valve 21. An annular rearward-facing shoulder 53 is defined in the radially outer periphery of each valve seat 50, 51 and is positioned within the housing to face a similar annular forward-facing shoulder 43 defined in the interior region 15. An annular wave spring 54, illustrated in detail in FIGS. 8 and 9, is disposed in the annular space between shoulders 43 and 53. Spring 54 is made up of multiple turns of spring metal (e.g., stainless steel) and applies a constant and uniform resilient bias force to shoulder 53 of the valve seat to urge that seat in a forward direction so that annular seat ring 52 contacts ball valve 21 in a slidable sealing engagement. In this regard, seat ring 52 is slightly compressible to assure good slidable and sealing contact.

The rearward portion of the radially outward-facing surface of the valve seat is adapted to contact the interior wall of housing 10 in order to permit selective slidable movement of the valve seat in an axial direction. In this regard, a suitable O-ring 55 and back-up sealing ring 56 are disposed in a suitable annular channel 57 defined in the radially outward-facing surface of the valve seat to effect sealing between the valve seat and the housing forwardly of spring 54. A second channel 58 defined in the radially outward-facing surface, rearwardly of spring 54, receives another O-ring 59 to effect the desired sealing function.

The forward portion 60 of the radially outward-facing surface of the valve seat 50, 51 constitutes a camming surface and is convex so as to taper toward the seat ring 52 serving as the forward tip of the seat unit. In other words, and as best illustrated in FIGS. 3 and 4, camming surface 60 forms a cam angle with a reference plane P oriented perpendicular to the axial direction of flow and to the bias force exerted by spring 54. This cam angle increases as a function of axial displacement from the forward end of the valve seat. The importance of this cam angle is described below.

It is to be noted that the only difference between the valve seat embodiments illustrated in FIGS. 3 and 4 relates to the manner in which the taper is formed in convex camming surface 60. In the embodiment illustrated in FIG. 3, the camming surface is formed in discrete planar segments disposed in an axial sequence. The forwardmost segment 61 subtends a cam angle $\alpha$ with reference plane P. The next segment 62 subtends a cam angle $\beta$, and the final segment 63 subtends a cam angle $\gamma$. Angles $\alpha$, $\beta$ and $\gamma$ increase in size in the sequence stated in accordance with the requirement that the cam angle for camming surface 60 increase as a function of axial displacement from the forward end of the valve seat. It is to be understood that although three discreet sections 61, 62 and 63 are provided in the camming surface illustrated in FIG. 3, a greater or lesser number of such surfaces may be employed.

In the valve seat embodiment illustrated in FIG. 4, camming surface 60 is defined as a continuous curve, approximating a paraboloid, as opposed to including discrete sections 61, 62, 63 as employed in the FIG. 3 embodiment. Both configurations operate in the same manner in accordance with the principles described below.

Valve seats 50, 51 are preferably made of suitable metal (e.g., carbon or stainless steel) and are provided with annular grooves at their forward end for receiving the nylon (or other material) seat ring 52. For some applications it may be desirable, or acceptable, to fabricate the valve seat from other materials, such as different metals, plastics, etc. Similar material preferences and alternatives are applicable to the valve housing 10 and ball valve 21.

Housing 10 has defined therein four threaded retraction ports 65 extending substantially radially inward to communicate between the housing exterior and the interior region 15. Two retraction ports 65 are associated with each valve seat 50, 51 and are located so as to open into interior region 15 at substantially diametrical opposed locations in juxtaposition with the reardmost portion of camming surface 60 (i.e., the portion subtending the largest cam angle) when seat ring 52 is in engagement with ball valve 21 (see FIG. 7). It is not crucial that these two retraction ports be located at exactly diametrically opposite positions (i.e., they need not be angularly spaced precisely by 180 degrees), but they should be located on opposite sides of the housing. Also, it is not crucial that the retraction ports be oriented precisely radially (i.e., perpendicular to the direction of flow); in other words, the ports may be slightly skewed to include a small axial direction component. However, a radial orientation provides for most efficient valve seat retraction.

During normal valve operation, each retraction port 65 is engaged by a threaded retraction port screw 66 which, when tightened, urges a gasket or O-ring 67 into sealing engagement with housing 10 at the periphery of port 65. When it is desired to retract a valve seat from its slidable sealing engagement with ball valve 21, screw 66 and O-ring 67 are removed from the appropriate port 65 and replaced by retraction tool 70. The retraction tool, illustrated in FIGS. 5 and 6, includes a knurled knob, a threaded shaft adapted to threadedly engage the threaded retraction port 65, and a generally conical distal end 71. Whereas retraction port screw 66 is too short to contact the valve seat 50, 51, the retraction tool is substantially longer so as to extend inward, when fully inserted into port 65, approximately to or just shy of seat ring 52 at the forward end of the camming surface 60. During insertion the retraction tool 70 initially contacts the rearward portion of the camming surface 60 where the cam angle is greatest. As insertion continues the tool applies a force to the valve seat at the camming surface, which force is directionally distributed (i.e., resolved into radial and axial components) as a function of the cam angle at the point of contact. The axial force component moves the valve seat axially so as to displace it from its engagement with ball valve 21. For large cam angles the axial force component is relatively small. As the cam angle decreases the axial force component, opposing the bias spring 54, becomes greater. Also, when the cam angle is large, as tool 70 moves inwardly a given distance, it effects a greater axial displacement of the seat (i.e., the point of contact between the tool and camming surface moves a greater distance) than when the cam angle is small. The initial range of tool insertion, therefore, effects the greatest axial retraction of the valve seat, but the final portion of the insertion applies the greater axial force. In this regard it must be noted that the bias force exerted by the spring 54 increases as it is increasingly compressed by retraction of the seat. Therefore, the greater axial force applied at the end of the tool insertion procedure is required to stably restrain the valve seat in a desired retraction position.

The actual retraction procedure for seat 50 or 51 is preferably performed with two tools simultaneously inserted into opposed retraction ports 65 to simultaneously retract the seat at two spaced locations. Importantly, the threaded engagement the tapered camming surface 60 permit precise control over the retraction position by converting rotation of the retraction tool 70 into lineal retraction of the valve seat. The degree of precision of this control is determined by the pitch of the threads in retraction port 65 and by the angle of the camming surface at the point of tool contact.

As best illustrated in FIG. 5, the conical distal end 71 of tool 70 subtends an angle $\delta$ with the axis of the tool. It is preferred that this tool angle be equal to or greater than the largest cam angle on camming surface 60. In a typical embodiment, for example, and with reference to the FIG. 3 embodiment of camming surface 60, $\alpha$ may be forty degrees, $\beta$ may be fifty degrees and $\gamma$ may be fifty-seven degrees. Under such circumstances, a suitable tool angle $\delta$ is sixty degrees. It should also be noted that, although a conical configuration is most desirable for tool tip 71, other configurations (e.g., a spherical segment) may be employed as long as such configurations permit the tool tip to slide along the camming surface while applying the axial retraction force to the valve seat.

It is important to note that the valve seats 50, 51 may be retracted from contact with the ball valve 21 without removing the bonnet 18. Also, the precise control over the retraction position is provided without sacrificing the advantages afforded by a reliable ball/seat engagement effected by spring-loading the valve seat during normal operation.

Having described preferred embodiments of a new and improved method and apparatus for retracting a valve seat in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What I claim is:

1. In a valve assembly having: a housing with axially spaced inlet and outlet ports, a housing interior region disposed between said inlet and outlet ports, and an access opening disposed proximate said interior region; a removable cover for sealingly closing said access opening; a ball valve member disposed in said interior region for controlling flow between said inlet and outlet ports and selectively removable from said interior region through said access opening; and at least one retractable annular valve seat having a forward end urged axially by a resilient bias force into slidable sealing engagement with said valve member;

means for selectively retracting said valve seat away from said valve member comprising:

a substantially convex camming surface defined as a radially outward-facing surface of said valve seat, said camming surface subtending a cam angle with a reference plane oriented perpendicular to flow through said valve assembly, said cam angle increasing as a function of axial displacement from said forward end of said valve seat;

at least one threaded retraction port defined through said housing and extending radially inward from outside said housing to a location in said interior region juxtaposed with said camming surface of said valve seat at an axial position rearward of said forward end when said valve member and said valve seat are in sealing engagement;

selectively removable sealing means for sealing said one retraction port during operation of said valve assembly; and first retraction tool means adapted for radial insertion into said interior region through said one retraction port when said sealing means is removed from said retraction port, said retraction tool means having a distal end and a threaded shaft portion for threadedly engaging said threaded retraction port, said distal end being oriented to contact said camming surface and forcefully axially displace said valve seat from said valve member as said distal tool end is increasingly extended radially into said housing interior region, whereby the cam angle at the point of contact between said camming surface and said distal tool end changes and becomes smaller as the radial insertion of said retraction tool means increases and said distal end slides along the camming surface.

2. The valve assembly according to claim 1 wherein said distal end of said retraction tool means has a substantially conical configuration defined by a bearing surface forming a tool angle with said reference plane which is smaller than said cam angle along substantially the entire camming surface of said valve seat.

3. The valve assembly according to claim 2 wherein said seat member includes a radially-extending annular seat shoulder axially displaced from and facing away from said forward end of said valve seat, wherein said housing includes a radially-extending annular housing shoulder facing said seat shoulder and axially spaced therefrom when said valve seat is in sealing engagement with said valve member, and further comprising an annular spring member disposed in the space between said seat shoulder and said housing shoulder for providing said resilient bias force to urge said valve seat into slidable sealing engagement with said valve member.

4. The valve assembly according to claim 3 wherein said camming surface includes a plurality of discrete segments disposed in axial sequence away from said forward end of said valve seat, the cam angle of successive segments in the sequence being greater than the cam angle of preceding segments.

5. The valve assembly according to claim 3 wherein said camming surface is generally paraboloidal.

6. The valve assembly according to claim 1 wherein said camming surface includes a plurality of discrete segments disposed in axial sequence away from said forward end of said valve seat, the cam angle of successive segments in the sequence being greater than the cam angle of preceding segments.

7. The valve assembly according to claim 1 wherein said camming surface is generally paraboloidal.

8. The valve assembly according to claim 1 further comprising:

a second threaded retraction port defined through said housing at a location substantially diametrically opposite said one retraction port and extending radially inward to a location in said interior region juxtaposed with said camming surface at an axial position rearward of said forward end when said valve member and valve seat are in sealing engagement;

selectively removable sealing means for sealing said second retraction port during operation of said valve assembly; and second retraction tool means adapted for radial insertion into said interior region through said second retraction port when said sealing means is removed from said second retraction port, said second retraction tool means having a distal end and a threaded shaft portion for threadedly engaging said second threaded retraction port, said distal end being oriented to contact said camming surface and forcefully axially displace said valve seat from said valve member as said distal end of said second tool means is increasingly extended radially into said housing interior region, whereby the cam angle at the point of contact between said camming surface and said distal end of the second tool means becomes smaller as the radial insertion of said second retraction tool means increases and its distal end slides along the camming surface of the displaced valve seat;

wherein said first and said second retraction tool means can be simultaneously threadedly inserted through said one and said second retraction ports to forcefully axial displace said valve seat from said valve member simultaneously from two substantially diametrically spaced locations on said camming surface.

9. The valve assembly according to claim 8 wherein said assembly includes a second retractable annular valve seat having a forward end urged axially by a resilient bias force into slidable sealing engagement with said valve member on the opposite side of said valve member from said at least one retractable annular valve seat, and wherein said valve assembly further includes second means for selectively retracting said second valve seat away from said valve member, said second means comprising:

a substantially convex second camming surface defined as a radially outward-facing surface of said second valve seat, said second camming surface subtending a second cam angle perpendicular to said reference plane, said second cam angle increasing as a function of axial displacement from said forward end of said second valve seat;

third and fourth threaded retraction ports defined through said housing and extending from substantially diametrical opposite locations radially inward from outside said housing to an axial location in said interior region juxtaposed with said second camming surface of said second valve seat at an axial position rearward of said forward end when said second valve seat and said valve member are in sealing engagement;

selectively removable sealing means for sealing said third and fourth retraction ports during operation of said valve assembly; and wherein said first and second retraction tool means are adapted to be radially inserted through said third and fourth retraction ports, respectively, into said interior region when said sealing means are removed from said third and fourth retraction ports, said first and second retraction tool means being oriented such that their distal ends contact said second camming surface and forcefully axially displace said second valve seat from said valve member as said distal ends are increasingly extended, simultaneously, radially into said housing interior, whereby the second cam angle at the point of contact between said second camming surface and the distal ends of said first and second tool means becomes smaller as the radial insertion of said first and second tool means increases and said distal ends slide along the second camming surface of the displaced second valve seat;

wherein said first and second retraction tool means can be simultaneously threadedly inserted through said third and fourth retraction ports to forcefully axially displace said second valve seat from said valve member simultaneously from two substantially diametrically spaced locations on said second valve seat.

10. The valve assembly according to claim 1 wherein said selectively removable sealing means comprises a retraction port screw threaded to engage said one retraction port and having a length which is sufficient to preclude contact with said camming surface when said retraction port screw is fully inserted into said one retraction port, and gasket means disposed about said retraction port screw so as to be compressed by said screw against said housing when said retraction port screw is fully inserted into said one retraction port.

11. The valve assembly according to claim 1 wherein said at least one retraction port is defined through said housing at a location spaced from said access opening and said cover.

12. The method of retracting a valve seat, located in a valve housing, away from slidable sealing engagement with a ball valve member in opposition to a resilient bias force urging the forward end of the valve seat against the ball valve member, said method comprising the step of:

threadedly inserting a retraction tool into said valve housing via a retraction port in a direction perpendicular to the direction of said bias force to slide the distal end of said retraction tool along a convex camming surface of said valve seat which tapers toward said forward end of the valve seat, thereby forcefully displacing said valve seat from said ball valve member, by applying a variable and rotatably settable force to said valve seat at said camming surface in opposition to said resilient bias force, the retraction force increasing as the depth of insertion of said retraction tool increases with the rotatable setting.

13. The method according to claim 12 further comprising the step of:
selectively retaining said valve seat in any desired position within a continous range of positions displaced from said ball valve member, said step of selectively retaining including: threadedly inserting said retraction tool into said housing to the insertion extent necessary to achieve said position of said valve seat; and maintaining said retraction tool at said insertion extent.

14. The method according to claim 12 further comprising the step of:
sealing said retraction port independently of said retraction tool when said retraction tool is not inserted in said retraction port.

15. The method according to claim 12 including the step of simultaneously threadedly inserting two of said retraction tools into said valve housing via substantially diametrical spaced retraction ports to simultaneously slide said tools along said camming surface at said substantially diametrical spaced locations and thereby forcefully displace said valve seat with forces applied at two spaced locations on said camming surface.

16. The method according to claim 12 wherein the cam angle at the point of contact between the camming surface and the distal end of the tool becomes smaller as the insertion of said tool into said valve housing increases and the distal end of the tool slides along the camming surface.

17. In a valve assembly having: a housing with spaced inlet and outlet ports and a housing interior region disposed between said inlet and outlet ports; a ball valve member disposed in said housing interior region for controlling flow between said inlet and outlet ports; and at least one retractable annular valve seat having a camming surface at its forward end urged axially by a resilient bias force into slidable sealing engagement with said valve member;
means for selectively retracting said valve seat away from said valve member comprising:
at least one threaded retraction port defined through said housing and extending inwardly from outside said housing to a location juxtaposed with said valve seat at an axial position rearward of said forward end when said valve member and said valve seat are in sealing engagement;
selectively removable sealing means for sealing said one retraction port during operation of said valve assembly;
a threaded retraction tool adapted to be rotated in a first sense in threaded engagement with said retraction port so as to be inserted through said retraction port into contact with said valve seat when said sealing means is removed from said retraction port; and
camming means for converting said rotation in said first sense of said threaded tool into lineal displacement of said valve seat away from said ball valve member and in opposition to said resilient bias force, said camming means includes a point of contact between the valve seat and the retraction tool for applying a variable and rotatably settable retraction force to said valve seat at said camming surface in opposition to said resilient bias force, the retraction force increasing as the depth of insertion of said retraction tool increases with the rotatable setting.

18. The valve assembly according to claim 17 wherein said camming means comprises:
a substantially convex camming surface defined as a radially outward-facing surface of said valve seat, said camming surface tapering toward said forward end of said valve seat; and
wherein said retraction tool has a distal end oriented to contact said camming surface and forcefully axially displace said valve seat from said valve member as the distal end of said tool is increasingly extended into said housing interior region.

19. The valve assembly according to claim 18 wherein said distal end of said retraction tool has a substantially conical configuration defined by a bearing surface adapted to contact said camming surface.

20. The valve assembly according to claim 18 wherein said camming surface includes a plurality of discrete segments disposed in axial sequence away from said forward end of said valve seat, each segment forming a respective cam angle with a reference plane oriented perpendicular to the direction of flow through said valve assembly, the cam angle of successive segments in said sequence being greater than the cam angle of preceding segments.

21. The valve assembly according to claim 18 wherein said camming surface is generally parabolodial.

* * * * *